United States Patent [19]
Sato et al.

[11] Patent Number: 5,571,392
[45] Date of Patent: Nov. 5, 1996

[54] SOLID ION CONDUCTIVE POLYMER ELECTROLYTE AND COMPOSITION AND PRODUCTION METHOD THEREFOR

[75] Inventors: Takaya Sato; Hiroshi Yoshida; Soichiro Takenishi, all of Tokyo; Yasunobu Kodama, Hyogo; Tsukasa Ito, Hyogo; Takashi Sakai, Hyogo, all of Japan

[73] Assignees: Nisshinbo Industries, Inc., Tokyo; Sanyo Electric Co., Ltd., Osaka, both of Japan

[21] Appl. No.: 562,062

[22] Filed: Nov. 22, 1995

[30] Foreign Application Priority Data

Nov. 22, 1994 [JP] Japan ................................. 6-311272

[51] Int. Cl.$^6$ ............................................... H01M 6/18
[52] U.S. Cl. .......................... 204/296; 252/62.2; 429/33; 429/189; 429/192
[58] Field of Search .......................... 204/296; 429/192, 429/33, 189, 191; 521/27, 31, 35, 38, 39; 252/62.2

[56] References Cited

U.S. PATENT DOCUMENTS

| | | | |
|---|---|---|---|
| 4,797,190 | 1/1989 | Peck | 204/296 |
| 5,419,854 | 5/1995 | Wakabayashi et al. | 429/192 X |
| 5,433,876 | 7/1995 | Fauteux et al. | 252/62.2 |
| 5,453,335 | 9/1995 | Fauteux et al. | 429/192 |

*Primary Examiner*—Kathryn Gorgos
*Assistant Examiner*—John S. Starsiak, Jr.
*Attorney, Agent, or Firm*—Wenderoth, Lind & Ponack

[57] ABSTRACT

A solid ion conductive polymer electrolyte for use particularly in rechargeable batteries, capacitors and other electrochemical devices is comprised mainly of a hydroxyalkyl polysaccharide or a hydroxyalkyl polysaccharide derivative, a diester compound containing a polyoxyalkylene component, a monoester compound containing a polyoxyalkylene component and an ion conductive metallic salt.

7 Claims, 2 Drawing Sheets

SOLID ION CONDUCTIVE POLYMER ELECTROLYTE AND COMPOSITION AND PRODUCTION METHOD THEREFOR

BACKGROUND OF THE INVENTION

1. Field of the Invention

This invention relates to a solid ion conductive polymer electrolyte utilizable as an electrochemical material particularly for rechargeable batteries (secondary batteries), capacitors and the like.

2. Description of the Background Art

As the electrolytes of rechargeable batteries, capacitors etc. there have mainly been used liquid substances such as water, propylene carbonate, tetrahydrofuran and the like.

Since a liquid electrolyte is apt to leak, however, a hermetically sealed container has to be used to ensure its long-term stability.

Because of this, electrical and electronic devices using liquid electrolytes are heavy and require complex manufacturing processes.

In contrast, electrolytes consisting of solid ion-conductive material involve almost no possibility of leakage, simplify manufacture and enable reduction of product weight. Owing to these advantages, they are being vigorously researched.

Solid ion conductive electrolytes can be divided into inorganic and organic material types. Organic ion conductive solid electrolytes are superior to inorganic solid ion conductive electrolytes in the points of weight, formability and flexibility.

Organic solid ion conductive electrolytes are generally formed of a matrix polymer and an ion conductive metallic salt which is a low molecular weight compound.

The matrix polymer is the most important constituent of an organic solid ion conductive electrolyte because it is responsible both for solidifying the electrolyte and for serving as a solvent for dissolving the ion conductive metallic salt.

In 1978, M. B. Armand et al., working at the University of Grenoble in France, discovered that lithium perchlorate dissolves in ethylene oxide and reported that this system exhibits ionic conductivity of $10^{-7}$S/cm. Since then, similar research has been conducted regarding analogous polymers, including polypropylene oxide, polyethyleneimine, polyurethane, polyester and a wide range of other polymeric substances.

Application of organic polymers to solid electrolytes for rechargeable batteries is being pushed forward for taking advantage of their various merits, which include excellent film formability, flexibility and high energy characteristics when used in batteries.

Polyethylene oxide, which has been most thoroughly researched, is a polymer with high capacity for dissolving ion conductive metallic salts. However, it is a semicrystalline polymer, and when a large amount of metallic salt is dissolved therein, it forms a quasi-crosslinked structure that increases its crystallinity even further. As a result, the conductivity obtained is considerably lower than might be expected.

Ionic conductors dissolved in a matrix of linear polyether polymer such as polyethylene oxide migrate in the amorphous region above the glass transition temperature of the polymer matrix owing to local segment motion of the polymer chain.

Since the cations, which are responsible for the ionic conductivity, interact strongly with the polymer chain, their mobility is markedly affected by local segment motion of the polymer chain.

From the aspect of ionic conductor mobility, therefore, it is not wise to choose a linear polymer as the matrix polymer for a solid ion conductive polymer electrolyte.

Reported solid ion conductive polymer electrolytes consisting solely of linear polymers, such as polyethylene oxide, polypropylene oxide and polyethyleneimine, have room-temperature conductivities of $10^{-7}$S/cm or, at the very highest, $10^{-6}$S/cm.

To secure high ionic conductivity at room temperature, it is important to ensure the presence of many amorphous regions in which the ionic conductors can migrate and to use a polymer design which lowers the glass transition temperature of the polymer.

A method of introducing a branched structure into polyethylene oxide attempted for this purpose led to the synthesis of a polyethylene oxide derivative which exhibited high conductivity (about $10^{-4}$S/cm at room temperature) as a solid ion conductive polymer electrolyte (Naoya Ogata et al., Sen'i Gakkaishi (Journal of the Society of Fiber Science and Technology, Japan) Vol 46, No 2, p52–57, 1990). Owing to the complexity of the polymer synthesis method, however, the method has not been commercialized.

Another method proposed for securing ionic conductivity is that of imparting a three-dimensional network structure to a matrix polymer so as to prevent its crystallization.

Such a method is taught, for example, by Japanese Patent Public Disclosures Hei 4-112460 and 5-36483, which obtain a solid ion conductive polymer electrolyte by crosslinking and curing a polyoxyalkylene derivative of glycerin with polyisocyanate compound.

With this method, however, still unsolved problems arise:

Isocyanate reacts easily with moisture and is therefore difficult to manage from the points of storage and reactivity.

The urethane crosslinking reaction between the polyoxyalkylene derivative of glycerin and the polyisocyanate compound is affected by the ion conductive metallic salt and solvent components. As a result, the reactivity may be reduced or the reaction be accelerated. Because of this, the method of synthesizing the polymer matrix first and then impregnating it with the ion conductive metallic salt together with an appropriate solvent (the impregnation method) is generally used, despite its poor industrial productivity.

General-purpose aromatic isocyanate is susceptible to electrochemical degradation, while the reactivity of aliphatic isocyanate is low.

Formation into film requires a long period of reaction under heating.

Another example of using a polymer with a three-dimensional network structure for the polymer matrix is disclosed in Japanese Patent Public Disclosure Hei 5-25353, which teaches a method of polymerizing an acrylic or metacrylic monomer including a polyoxyalkylene component. Since the solubility of the ion conductive metallic salt in the monomer is low, however, the method is disadvantageous from the points that it requires addition of a third component such as vinylene carbonate and that the polymer obtained is low in physical strength.

SUMMARY OF THE INVENTION

The object of the present invention is to provide a solid ion conductive polymer electrolyte which exhibits high ionic conductivity, is excellent in film formability, forms a strong and tough film, and exhibits superior handling properties during industrial scale production.

For attaining this object, the present invention provides:

(1) A composition for a solid polymer electrolyte comprising 100 parts by weight of hydroxyalkyl polysaccharide and/or hydroxyalkyl polysaccharide derivative, 10-500 parts by weight of a diester compound containing a polyoxyalkylene component and a monoester compound containing a polyoxyalkylene component, and 5-1000 parts by weight of an ion conductive metallic salt;

(2) A composition according to (1), wherein the weight ratio of diester compound/monoester compound is 1-0.2;

(3) A composition for a solid polymer electrolyte according to (1), wherein the hydroxyalkyl polysaccharide derivative is a hydroxyalkyl polysaccharide derivative wherein some or all of the hydroxy groups in the hydroxyalkyl polysaccharide are introduced with substituents through ester bonding or ether bonding;

(4) A composition for a solid polymer electrolyte according to (1), wherein the diester compound containing a polyoxyalkylene component is represented by the formula

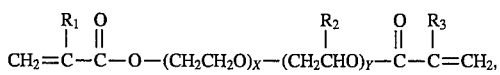

(wherein $R_1$, $R_2$, $R_3$ each represents H or a $C_1-C_6$ alkyl (i.e., methyl, ethyl, n-propyl, i-propyl, n-butyl, i-butyl, s-butyl, t-butyl, amyl isomers, and/or hexyl isomers), preferably $C_1-C_4$ and X and Y satisfy the condition of $X \geq 1$ and $Y \geq 0$ or the condition of $X \geq 0$ and $Y \geq 1$), and the monoester compound containing a polyoxyalkylene component is represented by the formula

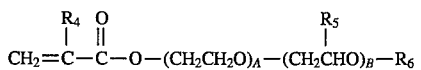

(wherein $R_4$, $R_5$, $R_6$ each represents H or a $C_1-C_6$ alkyl (i.e., methyl, ethyl, n-propyl, i-propyl, n-butyl, i-butyl, s-butyl, t-butyl, amyl isomers, and/or hexyl isomers), preferably $C_1-C_4$ and A and B satisfy the condition of $A \geq 1$ and $B \geq 0$ or the condition of $A \geq 0$ and $B \geq 1$);

(5) A composition for a solid polymer electrolyte according to (1), further comprising a solvent which can dissolve the ion conductive metallic salt;

(6) A method of producing a solid polymer electrolyte comprising a step of heating or exposing to ultraviolet rays, an electron beam, X rays, gamma rays, microwaves or high-frequency waves a composition for a solid poller electrolyte according to (1), thereby polymerizing the diester compound containing a polyoxyalkylene component and the monoester compound containing a polyoxyalkylene component and forming a three-dimensional crosslinked network by intertwining of polymer chains produced by the polymerization with molecular chains of the hydroxyalkyl polysaccharide and/or hydroxyalkyl polysaccharide derivative.

(7) A solid polymer electrolyte obtained by the method according to (6).

The solid ion conductive polymer electrolyte according to the invention is synthesized by using the diester compound containing a polyoxyalkylene component and the monoester compound containing a polyoxyalkylene component to form the hydroxyalkyl polysaccharide and/or hydroxyalkyl polysaccharide derivative containing the ion conductive metallic salt into a three dimensional network structure.

It is particularly noteworthy that at time the diester compound containing a polyoxyalkylene component 2 and the monoester compound containing a polyoxyalkylene component 3 undergo polymerization reaction and form the three-dimensional network structure, they form a semi-interpenetrating polymer network (semi-IPN) with the hydroxyalkyl polysaccharide 1 or the hydroxyalkyl polysaccharide derivative 1. The semi-IPN structure is shown conceptually in FIGS. 1 and 2. Unlike the case of merely mixing different types of polymer, the formation of the semi-IPN structure provides a number of advantages, including enhanced compatibility between the different types of polymer chains and increased interchain bonding force.

Attempts to increase film strength by forming an IPN structure go back many years. In a recent example, Nishio et al. at Nagaoka University of Technology reviewed a cellulosic IPN (Kobunshi, High Polymers, Japan, 43, 549, (1994)).

However, the composition of the cellulosic IPN of the present invention has not been reported and there are no known instances of cellulosic IPN being applied to batteries.

The inventors discovered that the formation of a semi-IPN structure also dramatically improves film characteristics in the case of a hydroxyalkyl polysaccharide or a hydroxyalkyl polysaccharide derivative.

In the course of their research for finding polymer and ion conductive metallic salt combinations with good interactivity, the inventors further discovered that hydroxyalkyl polysaccharides and hydroxyalkyl polysaccharide derivatives are good solvents of ion conductive metallic salts, satisfy all conditions required of a polymer for use in a solid ion conductive polymer electrolyte, and exhibit high conductivity.

In the case of a hydroxyalkyl polysaccharide or a hydroxyalkyl polysaccharide derivative, the ion conductive metallic salt appears to be mainly dissolved by the side chains.

Specifically, it was ascertained that since the metallic salt responsible for the conductivity is totally unaffected by local segment motion of the main chain of the polysaccharide, it exhibits conductivity that is ten times higher than that in case of a linear polymer such as polyethylene oxide. This can be clearly seen from a comparison of Example 1 and Comparative Example 3 set out below.

DESCRIPTION OF THE PREFERRED EMBODIMENTS

Figure 1:
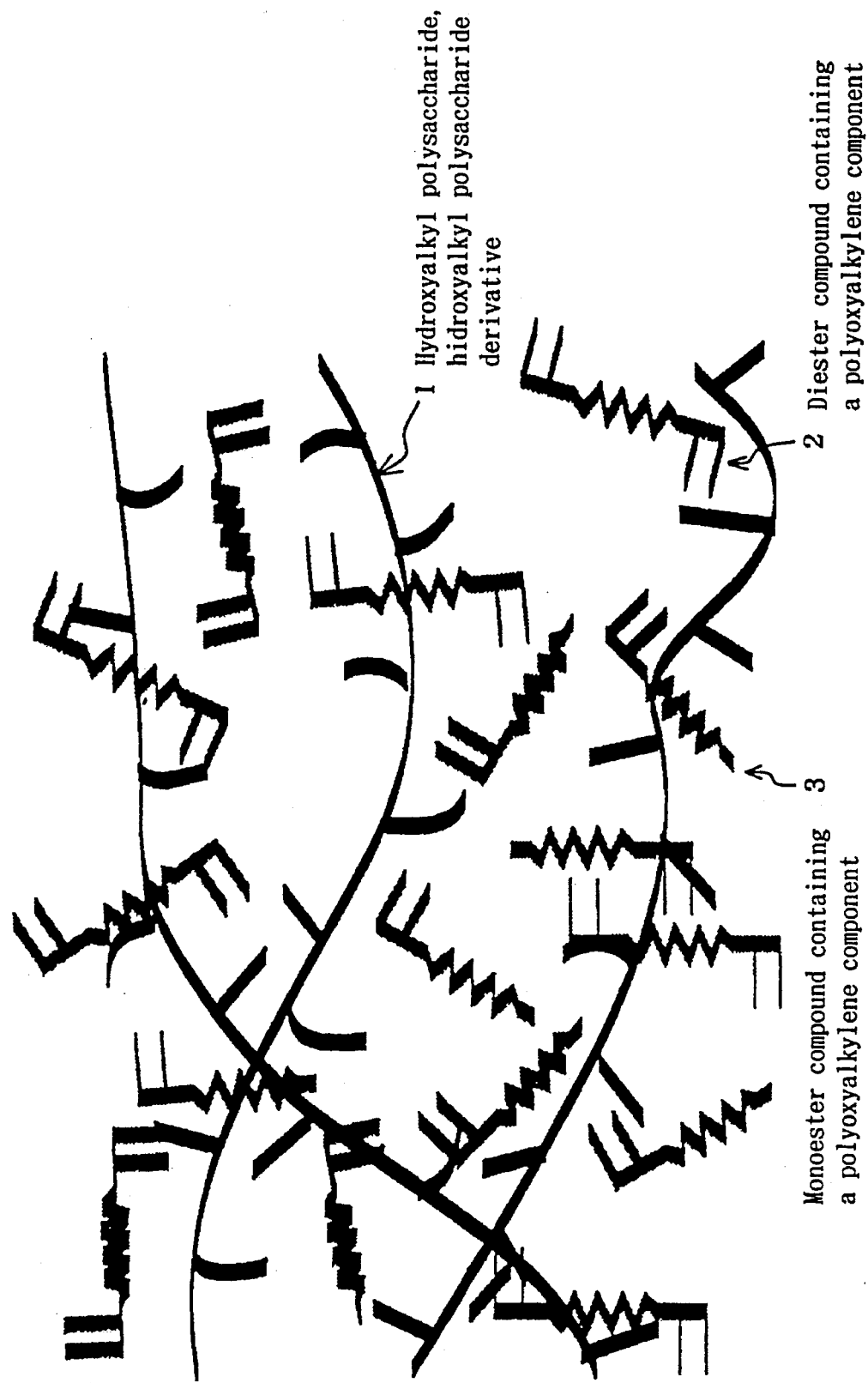
FIG. 1 is a conceptual view of the semi-IPN structure of the invention electrolyte before crosslinking reaction.

The term "hydroxyalkyl polysaccharide" used herein encompasses three types: hydroxyethyl polysaccharide, hydroxypropyl polysaccharide and dihydroxypropyl polysaccharide, which are respectively obtained by reacting naturally occurring polysaccharide such as cellulose, starch or the like with ethylene oxide, propylene oxide, and glycidol or 3-chloro-1,2-propanediol, respectively.

The term "hydroxyalkyl polysaccharide derivative" used herein refers to a polysaccharide derivative obtained by introducing substituents through ester or ether bonding to some or all of the hydroxy groups in a hydroxyalkyl polysaccharide molecule.

Usable polysaccharides include cellulose, starch, amylose, amylopectin, pullulan, Curdlan, mannan, glucomannan, arabinan, chitin, chitosan, alginic acid, carrageenan, dextran and the like. The polysaccharides are not limited as regards molecular weight, presence/absence of branched structure, type, orientation or sequence of their constituent saccharides, or the like.

From the point of easy procurement, however, cellulose and starch are preferable. Four types, hydroxyethyl cellulose, hydroxyethyl starch, hydroxypropyl cellulose and hydroxypropyl starch, are commercially available as products with various molar substitutions (MS) (molar substitution is a value indicating the number of substituent moles introduced per unit saccharide of the polysaccharide).

A method for synthesis of dihydroxpropyl cellulose is set out in U.S. Pat. No. 4,096,326 (1978). Other dihydroxpropyl polysaccharides can be synthesized by referring to known methods. (See T. Sato, et al., Makromol. Cem., 193, 647 (1992) or Macromolecules 24, 4691 (1991)).

These hydroxyalkyl polysaccharides can be used for solid ion conductive polymer electrolytes.

Hydroxyalkyl polysaccharides usable in the invention have molar substitutions of not less than 2. A hydroxyalkyl polysaccharide whose molar substitution is smaller than 2 is not usable because of its insufficient ability to dissolve ion conductive metallic salts. The hydroxyalkyl polysaccharide should have a molar substitution of not higher than an upper limit of 30, preferably not higher than 20. Industrial production of hydroxyalkyl polysaccharides with molar substitutions greater than 30 is difficult in light of the cost of industrial scale production and the complexity of the synthesis operation. Even if the required effort should be made, the increase in conductivity obtained would probably not be commensurate with the increase in molar substitution.

A hydroxyalkyl polysaccharide derivative obtained by introducing substituents through ester bonding or ether bonding to some or all of the hydroxy groups in a hydroxyalkyl polysaccharide can also be used for the solid ion conductive polymer electrolyte.

Specifically, as the solid ion conductive polymer electrolyte it is possible to use a hydoxyalkyl polysaccharide derivative obtained by introducing substituents including $C_1$–$C_6$ alkyl aromatic substituent groups and cyano groups into a hydroxyalkyl polysaccharide by use of cyano groups into a hydroxyalkyl polysaccharide by use of ester bonding or ether bonding.

The derivative obtained when hydroxy groups of hydroxypropyl cellulose are replaced by methyl groups, for example, is hydroxypropylmethyl cellulose, and is commercially available.

Moreover, cyanoethylated hydroxypropyl cellulose obtained by cyanoethylating hydroxypropyl cellulose, for example, also exhibits good properties for a solid ion conductive polymer electrolyte. (See Examples.)

Since the considerably high concentration of ion conductive metallic salt in the solid ion conductive polymer electrolyte promotes ion association in a polymer matrix of low dielectric constant, reduced conductivity owing to ion association may be observed. In such a case, ion association can be suppressed by increasing the polarity of the matrix.

From the point of raising the dielectric constant of the matrix polymer it is significant to cap the hydroxy groups of the hydroxyalkyl polysaccharide with a polar group.

An ion conductive metallic salt is dissolved in a hydroxyalkyl polysaccharide or hydroxyalkyl polysaccharide derivative set out in the foregoing, a diester compound containing a polyoxyalkylene component and a monoester compound containing a polyoxyalkylene component set out below are added thereto, and the resulting solution is reacted to obtain a solid ion conductive polymer electrolyte.

The ion conductive metallic salt used in the invention is not particularly limited and may be any such salt ordinarily used in electrochemical devices, including, for example, one or a mixture of two or more of $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$ and $(C_4H_9)_4NClO_4$. The amount added is preferably 5–1000 parts by weight, more preferably 50–300 parts by weight, per 100 parts by weight of the hydroxyalkyl polysaccharide or the hydroxyalkyl polysaccharide derivative.

When added at less than 5 parts by weight, the ionic conductor concentration is too lean, with the result that the conductivity is impractically low.

A content in excess of 1000 parts by weight exceeds the power of most polymer matrices to dissolve ion conductive metallic salt and results in salt precipitation.

Solid ion conductive polymer electrolytes are generally used in the form of a film clamped between the electrodes. Because of this, they are required to have excellent film formability and produce strong films.

The complex obtained according to the invention by dissolving an ion conductive metallic salt in a hydroxyalkyl polysaccharide or a hydroxyalkyl polysaccharide derivative is, as formed, insufficient in film formability and film strength for use as a solid ion conductive polymer electrolyte.

For example, some types of hydroxyalkyl polysaccharide derivatives with high molar substitutions exhibit liquid crystallinity at room temperature and their films are waxy and have low strength. In addition, most hydroxyalkyl polysaccharides and hydroxyalkyl polysaccharide derivatives with high molar substitutions are waxy in appearance.

Through their research directed to overcoming these problems, the inventors discovered that excellent film formability and film strength can be imparted by mixing a diester compound containing a polyoxyalkylene component and a monoester compound containing a polyoxyalkylene component with a mixture of a hydroxyalkyl polysaccharide or hydroxyalkyl polysaccharide derivative and an ion conductive metallic salt, reacting the resulting ion conductive electrolyte by exposing it to ultraviolet rays, an electron beam, X rays, gamma rays, microwaves or high-frequency waves, or by heating it, thereby forming a three-dimensional crosslinked network structure of semi-IPN structure.

The reactive monomers usable as crosslinking agents in this invention are a diester compound containing a polyoxyalkylene component represented by the formula

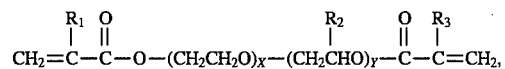

$$CH_2=C-C-O-(CH_2CH_2O)_x-(CH_2CHO)_y-C-C=CH_2,$$

(wherein $R_1$, $R_2$, $R_3$ each represents H or a $C_1$–$C_6$ alkyl (i.e., methyl, ethyl, n-propyl, i-propyl, n-butyl, i-butyl, s-butyl, t-butyl, amyl isomers, and/or hexyl isomers), preferably $C_1$–$C_4$ and X and Y satisfy the condition of $X \geq 1$ and $Y \geq 0$ or the condition of $X \geq 0$ and $Y \geq 1$), and a monoester compound containing a polyoxyalkylene component represented by the formula

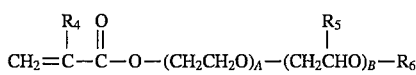

(wherein $R_4$, $R_5$, $R_6$ each represents H or a $C_1$–$C_6$ alkyl (i.e., methyl, ethyl, n-propyl, i-propyl, n-butyl, i-butyl, s-butyl, t-butyl, amyl isomers, and/or hexyl isomers), preferably $C_1$–$C_4$ and A and B satisfy the condition of $A \geq 1$ and $B \geq 0$ or the condition of $A \geq 0$ and $B \geq 1$).

When the diester compound containing a polyoxyalkylene component and the monoester compound containing a polyoxyalkylene component are mixed with the hydroxyalkyl polysaccharide or hydroxyalkyl polysaccharide derivative and the ion conductive metallic salt and, as contained in this mixture, are heated or exposed to ultraviolet rays, an electron beam, X rays, gamma rays, microwaves or high-frequency waves, they react to form a three-dimensional crosslinked network structure of semi-IPN structure.

At the time the formation of the three-dimensional network structure by polymerization of the diester compound containing a polyoxyalkylene component and the monoester compound containing a polyoxyalkylene component, a semi-interpenetrating polymer network (semi-IPN) is formed with the molecular chains of the hydroxyalkyl polysaccharide or the hydroxyalkyl polysaccharide derivative.

Unlike the case of merely mixing different types of polymer, the formation of the semi-IPN structure provides a number of advantages, including enhanced compatibility between the different types of polymer chains and increased interchain bonding force.

The film formability of the hydroxyalkyl polysaccharide or the hydroxyalkyl polysaccharide derivative of this invention is markedly improved by the formation of a semi-IPN structure.

The semi-IPN structure can generally be formed by polymerization after adding only a diester compound containing a polyoxyalkylene component to the hydroxyalkyl polysaccharide or the hydroxyalkyl polysaccharide derivative.

In this invention, however, a monoester compound containing a polyoxyalkylene component, namely, a functional monomer, is also intentionally added.

Figure 2:
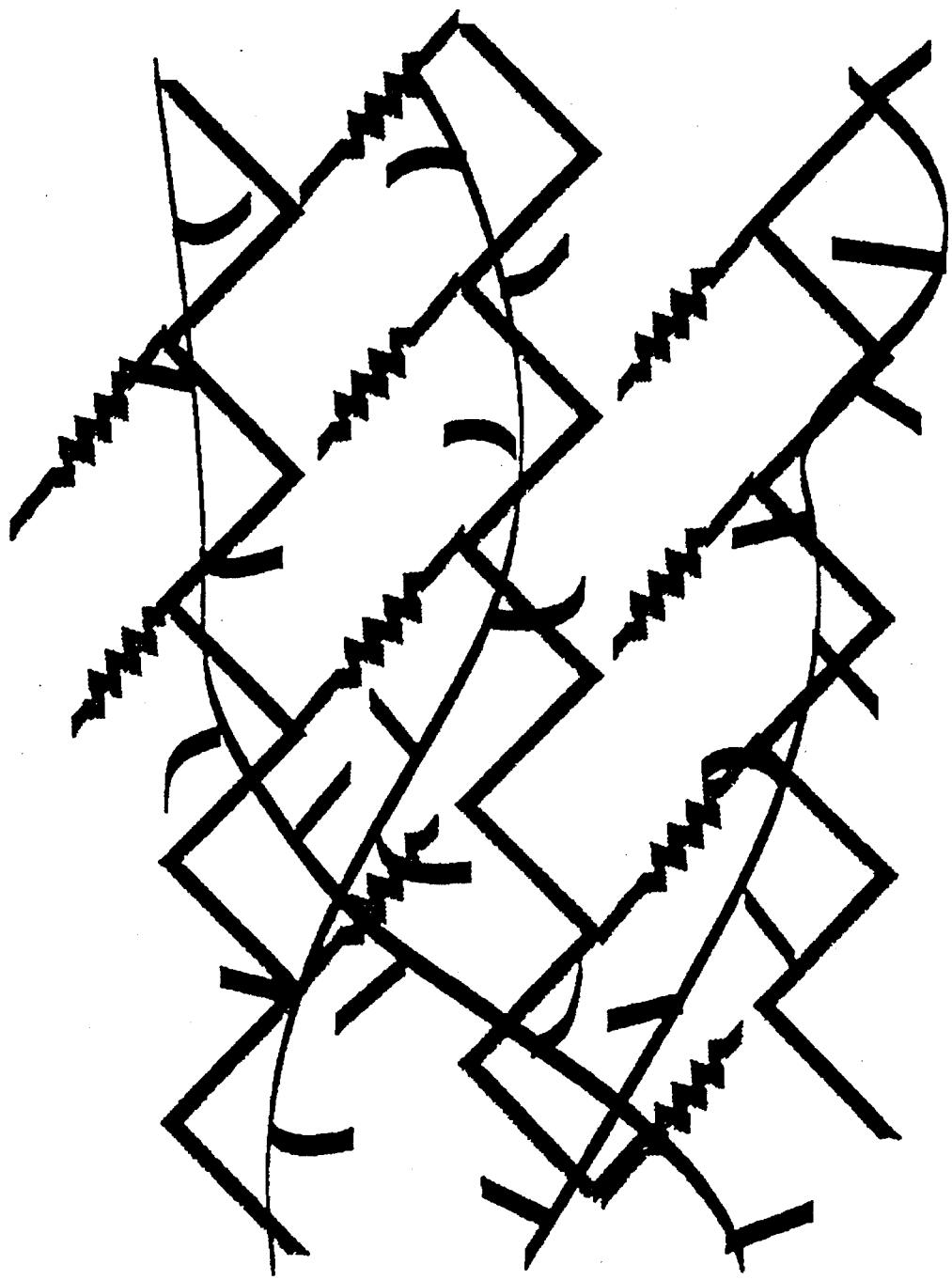
FIG. 2 is conceptual view of the semi-IPN structure of the invention electrolyte as formed into a three-dimensional network following crosslinking reaction.

The reason for this is that addition of the monoester compound introduces polyoxyalkylene branching onto the three-dimensional network. (See FIGS. 1 and 2.)

In the solid ion conductive polymer electrolyte of this invention, the metallic salt responsible for the ion conductivity is thought to strongly interact mainly with the branched hydroxyalkyl groups of the hydroxyalkyl polysaccharide or the hydroxyalkyl polysaccharide derivative or the hydroxyalkyl side branch portions at the branched portions of the three-dimensional network formed by polymerization of the diester compound containing a polyoxyalkylene component and the monoester compound containing a polyoxyalkylene component.

Since the metallic salt responsible for the conductivity can migrate totally unrestricted by local segment motion of the main chain of the polysaccharide, it exhibits conductivity that is ten times higher than that in case of a linear polymer matrix such as of polyethylene oxide. This can be clearly seen from a comparison of Example 1 and Comparative Example 3 set out below.

The diester compound containing a polyoxyalkylene component and the monoester compound containing a polyoxyalkylene component are preferably added in a combined amount of 10–500 parts by weight per 100 parts by weight of the hydroxyalkyl polysaccharide or the hydroxyalkyl polysaccharide derivative.

When the amount of their addition is less than 10 parts by weight, the film strength does not increase. Addition in excess of 500 parts by weight reduces the overall ability of the matrix to dissolve ion conductive metallic salt, leads to salt precipitation, brittle film and other such problems.

While the ratio between the amounts of the diester compound containing a polyoxyalkylene component and the monoester compound containing a polyoxyalkylene component is not particularly limited, from the point of film strength it is preferable for their weight ratio to be in the range of (diester compound containing a polyoxyalkylene component)/(monoester compound containing a polyoxyalkylene component)=1–0.2.

Although addition of a polymerization initiator is not required when the polymerization is conducted by use of an electron beam, one is ordinarily used in other cases.

Although the polymerization initiator is not particularly limited, it is possible to use such photopolymerization initiators as acetophenone, trichloroacetophenone, 2-hydroxy-2-methylpropiophenone, 2-hydroxy-2-methylisopropiophenone, 1-hydroxycyclohexylketone, benzoinether, 2,2-diethoxyacetophenone and benzyldimethylketal.

Moreover, as thermalpolymerization initiators there can be used high-temperature initiators such as cumenehydroperoxide, t-butylhydroperoxide, dicumyl peroxide and di-t-butyl peroxide, such ordinary initiators as benzoyl peroxide, lauroyl peroxide, persulfate and azobisisobutyronitrile, such low-temperature initiators (redox initiators) as hydrogen peroxide.ferrous salt, persulfate.acid sodium bisulfite, cumenehydroperoxide.ferrous salt, benzoyl peroxide.dimethylaniline, and peroxide.organometallic alkyl, triethylboron, diethylzinc, oxygen.organometallic alkyl and the like.

These polymerization initiators can be used singly or in mixtures of two or more. The polymerization initiator is added in the range of 0.1–1 part by weight per 100 parts by weight of the diester compound containing a polyoxyalkylene component and the monoester compound containing a polyoxyalkylene component.

Addition of less than 0.1 part by weight is not preferable because the rate of polymerization is extremely low. Addition of more than 1 part by weight is a waste of initiator.

The polymerization reaction conditions are not particularly limited. Photopolymerization, for example, is conducted under conditions of room temperature and exposure to ultraviolet rays in air at a luminous energy of 1–50 mW/cm$^2$ for 5–30 min.

When an electron beam is used, an acceleration voltage of 150–300 kV at room temperature suffices. In the case of thermalpolymerization, the reaction is conducted for 0.5–6 hours at 50°–120° C.

The polymer produced by photopolymerization forms a strong semi-IPN three-dimensional network structure by intertwining with molecular chains of the hydroxyalkyl polysaccharide or hydroxyalkyl polysaccharide derivative. No crystalline structure is formed and the matrix is amorphous.

From the points of equipment simplicity and running cost, the polymerization is preferably conducted by ultraviolet radiation or heating.

The polymerization reaction of the diester compound containing a polyoxyalkylene component and the monoester compound containing a polyoxyalkylene component progresses without interference from the ion conductive metallic salt mixed with the system. Therefore, unlike in the case of using a conventional polyurethane crosslinking agent, no need arises whatsoever for adopting the two-stage method (the impregnation method) in which the three-dimensional structure is formed using a system free of ion conductive metallic salt, whereafter the ion conductive metallic salt is dissolved in a solvent and the matrix polymer is impregnated with the ion conductive metallic salt together with the solvent.

The invention solid ion conductive polymer electrolyte is ordinarily produced in the following manner.

A prescribed amount of a hydroxyalkyl polysaccharide or a hydroxyalkyl polysaccharide derivative, a prescribed amount of an ion conductive metallic salt and a prescribed amount of a diester compound containing a polyoxyalkylene component and a monoester compound containing a polyoxyalkylene component are mixed in an appropriate amount of solvent.

The mixed solution is adjusted to the desired concentration by heating under reduced pressure to evaporate the solvent. It suffices to evaporate the solvent until the solution reaches a viscosity easily castable on the electrode.

If it is desired to increase the amount of ion conductive metallic salt dissolved in the solid ion conductive polymer electrolyte according to the invention and to increase the migration of dissolved metallic ions into the polymer matrix, the solvent need not be completely evaporated and a desired amount thereof can be left unevaporated.

In this solid ion conductive polymer electrolyte, since the polysaccharide polymer chains and the polymer chains of the copolymerized diester compound containing a polyoxyalkylene component and the monoester compound containing a polyoxyalkylene component intertwine to form a semi-IPN three-dimensional network structure, no problem whatsoever arises as regards film strength even if the solvent is allowed to remain at the rate of 1–8000 parts by weight, preferably 1–300 parts by weight, per 100 parts by weight of the hydroxyalkyl polysaccharide or the hydroxyalkyl polysaccharide derivative.

Residual solvent of more than 8000 parts by weight is undesirable since a content of this level reduces the film strength no matter how strong a semi-IPN network structure is formed. On the other hand, residual solvent of less than 1 part by weight produces no effect.

In a case where the system does not contain a hydroxyalkyl polysaccharide or a hydroxyalkyl polysaccharide derivative, i.e., in the case of a simple three-dimensional structure obtained by polymerization reacting only a diester compound containing a polyoxyalkylene component and a monoester compound containing a polyoxyalkylene component, the amount of solvent that can be retained in the matrix is, at most, about 250%, and in practical applications one added with solvent at more than 100% is difficult to treat as a self-supporting film. Excessive solvent deprives the film of its self-supporting property. This also points up the effect of the semi-IPN structure.

Solvents usable in the solid ion conductive polymer electrolyte according to this invention include chain ethers such as dibutylether, 1,2-dimethoxyethane, 1,2-ethoxymethoxyethane, methyldiglyme, methyltriglyme, methyltetragylme, ethylgylme, ethyldigylme, butyldiglyme and the like, and glycolethers (ethyl Cellosolve, ethyl Carbitol, butyl Cellosolve, butyl Carbitol and the like), heterocyclic ethers such as tetrahydrofuran, 2-methyltetrahydrofuran, 1,3-dioxolan and 4,4-dimethyl-1,3-dioxane, such butyrolactones as γ-butyrolactone, γ-valerolactone, δ-valerolactone, 3-methyl-1,3-oxazolidine- 2-on, 3-ethyl-1,3-oxazolidine-2-on, and other solvents commonly used in electrochemical devices such as water, alcohol solvents (methanol, ethanol, butanol, ethylene glycol, propylene glycol, diethylene gylcol, 1,4-butanediol , glycerin and the like), polyoxyalkylenepolyols (ethylene oxide, polypropylene oxide, polyoxyethylene.oxypropylene glycol and combinations of two or more of these), amide solvents (N-methylformamide, N,N-dimethylformamide, N-methylacetoamide, N-methylpyrrolidinone and the like), carbonate solvents (propylene carbonate, ethylene carbonate, styrene carbonate and the like), and imidazolidinon solvents (1,3-dimethyl-2-imidazolidinon and the like). Mixtures of two or more of these solvents can be used.

The solution is adjusted to the desired composition, added with a prescribed amount of polymerization initiator and cast onto a substrate to the desired thickness using a knife coater.

The resulting film is irradiated with ultraviolet rays, an electron beam, X rays, gamma rays, microwaves or high-frequency waves, etc., or the ion conductive electrolyte is heated, thereby producing a solid ion conductive polymer electrolyte exhibiting excellent ion conductivity.

The invention will now be explained with reference to specific examples. It is not, however, limited to the described examples. The term "parts" used in the following description refers to parts by weight.

EXAMPLES

Example 1

One part hydroxypropyl cellulose (molar substitution (MS)=4.65, product of Nippon Soda Co. Ltd.) and 1 part lithium perchlorate anhydride were dissolved in 10 parts tetrahydrofuran as solvent and the resulting solution was added with 0.5 part poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

The mixed solution was held at 40° C. under reduced pressure to remove tetrahydrofuran until the remaining amount of the solution was 4.2 parts.

Next, 0.05 part benzyldimethylketal was dissolved into the solution as a polymerization initiator and the result was spread on a substrate (copper plate) using a doctor knife applicator.

The spread layer was polymerized by irradiating it with ultraviolet rays in room-temperature air at a luminous energy of 6 mW/cm$^2$ for 20 min, thereby producing a solid ion conductive polymer electrolyte.

Example 2

Without use of a solvent, 1 part hydroxypropyl cellulose (molar substitution (MS)=4.65, product of Nippon Soda Co. Ltd.), 2 parts lithium perchlorate anhydride, 2.5 parts poly-(ethyleneglycol)dimethacrylate (oxyethylene unit number= 9, product of Nippon Oil and Fats Co., Ltd.) and 2.5 parts methoxypoly(ethyleneglycol)monomethacrylate (oxyethylene unit number=9, product of Nippon Oil and Fats Co., Ltd.) were mixed under stirring at 70° C.

Next, 0.05 part benzyldimethylketal was added to the resulting mixed solution as a polymerization initiator and the result was spread on a substrate (copper plate) using a doctor knife applicator.

The spread layer was polymerized by irradiating it with ultraviolet rays in room-temperature air at a luminous energy of 6 mW/cm$^2$ for 20 min, thereby producing a solid ion conductive polymer electrolyte.

Example 3

One part hydroxypropyl cellulose (molar substitution (MS)=4.65, product of Nippon Soda Co. Ltd.) and 1 part lithium perchlorate anhydride were dissolved in a mixed solvent consisting of 10 parts tetrahydrofuran and 10 parts propylene carbonate, and the resulting solution was added with 1.5 parts poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

The viscosity of the mixed solution was adjusted by holding it at 40° C. under reduced pressure to remove solvent until the total remaining amount of the mixed solution was 15 parts. Next, 0.05 part benzyldimethylketal was dissolved into the solution as a polymerization initiator and the result was spread on a substrate (Teflon plate) using a doctor knife applicator.

The spread layer was polymerized by irradiating it with ultraviolet rays in room-temperature air at a luminous energy of 6 mW/cm$^2$ for 20 min, thereby producing a solid ion conductive polymer electrolyte.

Example 4

A solid ion conductive polymer electrolyte was produced in the same manner as in Example 3 except that the mixed solution was spread on the substrate (Teflon plate) before being added with the polymerization initiator and that polymerization was conducted by irradiation with an electron beam using an electron beam irradiation device having an acceleration voltage of 200 kV.

Example 5 (Cyanoethylation of Hydroxypropyl Cellulose [I])

8 g of hydroxypropyl cellulose (molar substitution (MS)=4.65, product of Nippon Soda Co. Ltd.) was suspended in 400 ml of acrylonitrile, whereafter the suspension was added with 1 ml of 4 wt % aqueous solution of sodium hydroxide and stirred for 4 hr at 30° C.

After neutralization with acetic acid, this mixed reaction solution was poured into a large amount of methanol to obtain cyanoethylated hydroxypropyl cellulose.

The cyanoethylated hydroxypropyl cellulose was removed of impurities by dissolving it in acetone, charging the solution into a dialysis film tube and subjecting it to dialysis purification using ion-exchange water.

The cyanoethylated hydroxypropyl cellulose precipitated during dialysis was collected, dried, and used to produce a solid ion conductive polymer electrolyte.

Elementary analysis of the so-obtained cyanoethylated hydroxypropyl cellulose showed its N content to be 7.3 wt %. From this value it can be concluded that the substitution rate of hydroxy groups in the hydroxypropyl cellulose by cyanoethyl groups was 94%.

One part of this cyanoethylated hydroxypropyl cellulose was used to produce a solid ion conductive polymer electrolyte by a method similar to that used for the production of a solid ion conductive polymer electrolyte in Example 3.

Example 6 (Cyanoethylation of Hydroxypropyl Cellulose [II])

8 g of hydroxypropyl cellulose (molar substitution (MS)=4.65, product of Nippon Soda Co. Ltd.) was suspended in 400 ml of acrylonitrile, whereafter the suspension was added with 1 ml of 40 wt % aqueous solution of sodium hydroxide and stirred for 40 min at 30° C.

After neutralization with acetic acid, this mixed reaction solution was poured into a large amount of methanol to obtain cyanoethylated hydroxypropyl cellulose.

The cyanoethylated hydroxypropyl cellulose was removed of impurities by dissolving it in N,N-dimethylformamide, charging the solution into a dialysis film tube and subjecting it to dialysis purification using ion-exchange water.

The dialyzate was freeze-dried and the cyanoethylated hydroxypropyl cellulose obtained was dried again and used to produce a solid ion conductive polymer electrolyte.

Elementary analysis of the so-obtained cyanoethylated hydroxypropyl cellulose showed its N content to be 3.2 wt %. From this value it can be concluded that the substitution rate of hydroxy groups in the hydroxypropyl cellulose by cyanoethyl groups was 34%.

One part of this cyanoethylated hydroxypropyl cellulose was used to produce a solid ion conductive polymer electrolyte by a method similar to that used for the production of a solid ion conductive polymer electrolyte in Example 3.

Example 7 (Synthesis of Dihydroxypropyl Cellulose [I])

Following the Turbak method (A. F. Turbak et al., Chem. Abstr. 94, 123426S (1981)), rayon pulp was dissolved in a mixed solvent of lithium chloride/dimethlyacetamide (LiCl/DMAc) to a cellulose concentration of 2 wt %.

500 ml of this solution was added with 10 g of powdered sodium hydroxide and stirred for 1 hr at 50° C.

Over a period of more than 3 hr, the solution was slowly added with a solution of 91 g of glycidol dissolved in 100 ml of dimethylacetamide and then reacted for 12 hr at 50° C. under stirring.

After completion of the reaction, the reacted mixed solution was poured into a large amount of acetone to obtain a sediment of dihydroxypropyl cellulose. Analysis of the obtained dihydroxypropyl cellulose by $^{13}$C-NMR showed it to have a molar substitution (MS) of 4.1.

A solid ion conductive polymer electrolyte was produced by the same method as used for producing a solid ion conductive polymer electrolyte in Example 3 except that 1 part dihydroxypropyl cellulose (MS=4.1) was used in place of the hydroxypropyl cellulose used in Example 3.

Example 8 (Synthesis of Dihydroxypropyl Cellulose [II])

500 ml of a mixed solution of cellulose in lithium chloride/dimethlyacetamide (LiCl/DMAc) having a cellulose concentration of 2 wt % was added with 10 g of powdered sodium hydroxide and stirred for 1 hr at 50° C.

Over a period of more than 3 hr, the solution was slowly added with a solution of 91 g of glycidol dissolved in 100 ml of dimethylacetamide and then reacted for 12 hr at 50° C. under stirring.

The reaction process was then repeated. Specifically, over an additional period of more than 3 hr, the solution was slowly added with a solution of 91 g of glycidol dissolved in 100 ml of dimethylacetamide and then reacted for 12 hr at 50° C. under stirring.

After completion of the reaction, the reacted mixed solution was poured into a large amount of acetone to obtain a sediment of dihydroxypropyl cellulose. Analysis of the obtained dihydroxypropyl cellulose by $^{13}$C-NMR showed it to have a molar substitution (MS) of 10.5.

A solid ion conductive polymer electrolyte was produced by the same method as used for producing a solid ion conductive polymer electrolyte in Example 3 except that 1 part dihydroxypropyl cellulose (MS=10.5) was used in place of the hydroxypropyl cellulose used in Example 3.

Example 9 (Synthesis of Cyanoethylated Dihydroxypropyl Cellulose)

Cyanoethylated dihydroxypropyl cellulose was obtained by conducting cyanoethylation by the method [I] of Example 5 except that dihydroxypropyl cellulose (MS=4.1) was used in place of hydroxypropyl cellulose.

The so-obtained cyanoethylated dihydroxypropyl cellulose had an N content of 11.9 wt %. From this value it can be concluded that the substitution rate of hydroxy groups in the dihydroxypropyl cellulose by cyanoethyl groups was 92%.

A solid ion conductive polymer electrolyte was produced by the same method as used for producing a solid ion conductive polymer electrolyte in Example 3 except that 1 part cyanoethylated dihydroxypropyl cellulose was used in place of the hydroxypropyl cellulose used in Example 3.

Example 10 (Synthesis of Acetylated Hydroxypropyl Cellulose)

8 g of hydroxypropyl cellulose (molar substitution (MS)= 4.65, product of Nippon Soda Co. Ltd.) was suspended in a mixed solvent consisting of 300 ml of acetic acid and 300 ml of methylene chloride, whereafter the suspension was added with 4 ml of 70 wt % aqueous solution of perchloric acid and 400 ml of acetic anhydride and stirred for 1.5 hr at 25° C.

The reacted mixed solution was poured into a large amount of ethanol to obtain acetylated hydroxypropyl cellulose.

A solid ion conductive polymer electrolyte was produced by the same method as used for producing a solid ion conductive polymer electrolyte in Example 3 except that 1 part acetylated hydroxypropyl cellulose was used in place of the hydroxypropyl cellulose used in Example 3.

Example 11

One part hydroxyethyl starch (product of Penford Products, Ltd.) and 1 part lithium perchlorate anhydride were dissolved in 10 parts distilled water as solvent and the resulting solution was added with 0.5 part poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

Next, 0.01 part benzyldimethylketal was added to the resulting solution as a polymerization initiator and the result was spread on a substrate (copper plate) using a doctor knife applicator.

The spread layer was polymerized by irradiating it with ultraviolet rays in room-temperature air at a luminous energy of 6 mW/cm$^2$ for 20 min, thereby producing a solid ion conductive polymer electrolyte.

Example 12 (Synthesis of Dihydroxypropyl Dextran)

5.0 g of dextran (product of Wako Pure Chemicals Co., Ltd., molecular weight: 60000–90000) was dispersed in 150 ml of acetone and a solution of 1.5 g of sodium hydroxide dissolved in 10 ml of distilled water was dripped into the suspended solution at room temperature under stirring for 20 min.

Next, the solution was added by dripping with a solution obtained by dissolving 12 g of glycidol in 40 ml acetone and then reacted for 6 hr at 50° C.

A gummy substance was removed from the reacted mixed solution and dissolved in distilled water. The solution was neutralized with acetic acid, charged in a cellulose dialysis film tube and dialyzed using distilled water.

The solution after dialysis was freeze-dried to obtain dihydroxypropyl dextran. Analysis of the obtained dihydroxypropyl dextran by $^{13}$C-NMR showed it to have a molar substitution (MS) of 2.5.

A solid ion conductive polymer electrolyte was produced by the same method as in Example 11 except that 1 part dihydroxypropyl dextran was used in place of the hydroxyethyl starch used in Example 11.

Example 13 (Synthesis of Cyanoethylated Hydroxyethyl Starch)

Cyanoethylated hydroxyethyl starch was synthesized by conducting cyanoethylation by the method [I] of Example 5 using hydroxyethyl starch (product of Penford Products, Ltd.). The so-obtained cyanoethylated hydroxyethyl starch had an N content of 7.1 wt %.

A solid ion conductive polymer electrolyte was produced by the same method as used for producing a solid ion conductive polymer electrolyte in Example 3 except that 1 part cyanoethylated hydroxyethyl starch was used in place of the hydroxypropyl cellulose used in Example 3.

Example 14

One part hydroxypropyl cellulose (molar substitution (MS)=4.65, product of Nippon Soda Co. Ltd.) and 1 part lithium perchlorate anhydride were dissolved in 10 parts tetrahydrofuran as solvent and the resulting solution was added with 0.5 parts poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

The mixed solution was held at 40° C. under reduced pressure to remove tetrahydrofuran until the remaining amount of the mixed solution was 4.2 parts.

Next, 0.05 part azobisisobutyronitrile was dissolved into the solution as a polymerization initiator and the result was spread on a substrate (copper plate) using a doctor knife applicator. The spread layer was thermalpolymerized by heating it in a 105° C. oven for 1 hr, thereby producing a solid ion conductive polymer electrolyte.

Example 15

A solid ion conductive polymer electrolyte was produced in the same manner as in Example 3 except that 25 parts propylene carbonate was used as solvent and none of the solvent was removed from the mixed solution.

Example 16

A solid ion conductive polymer electrolyte was produced in the same manner as in Example 3 except that 0.5 part poly(ethyleneglycol)dimethacrylate and 2.5 parts methoxypoly(ethyleneglycol)monomethacrylate were used.

Example 17

A solid ion conductive polymer electrolyte was produced in the same manner as in Example 3 except that 3 parts propylene carbonate and 0.1 part each of poly(ethyleneglycol)dimethacrylate and methoxypoly(ethyleneglycol)monomethacrylate were used and solvent was removed until the total remaining amount of the mixed solution was 2.4 parts.

Comparative Example 1

One part hydroxypropyl cellulose (molar substitution (MS)=4.65, product of Nippon Soda Co. Ltd.) and 1 part lithium perchlorate anhydride were dissolved in 10 parts tetrahydrofuran and 10 parts propylene carbonate was added to the result and mixed.

The mixed solution was held at 40° C. under reduced pressure to remove solvent until the total remaining amount of the mixed solution was 12 parts. An ion conductive composition was produced by spreading the resulting solution on a substrate (copper plate) using a doctor knife applicator.

When the obtained ion conductive composition was stood upright on the substrate (copper plate), the composite flowed and deformed. It could not be termed a solid.

Comparative Example 2

One part lithium perchlorate anhydride was dissolved in 10 parts propylene carbonate, and the resulting solution was added with 0.5 part poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

0.05 part benzyldimethylketal was dissolved in the resulting solution as a photopolymerization initiator. Since the resulting solution could not be spread with a doctor knife applicator, it was poured into a Teflon Petri dish and polymerized by irradiating it with ultraviolet rays in room-temperature air at a luminous energy of 6 mW/cm$^2$ for 20 min, thereby producing an ion conductive composition.

The obtained ion conductive composition was so brittle that it could not be lifted without breaking. It was extremely frail.

Comparative Example 3

One part polyethylene oxide (product of Wako Pure Chemicals Co., Ltd., molecular weight: 2000) and 1 part lithium perchlorate anhydride were dissolved in 10 parts tetrahydrofuran as solvent and the resulting solution was added and mixed with 0.5 part poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

The mixed solution was held at 40° C. under reduced pressure to remove tetrahydrofuran until the total remaining amount of the mixed solution was 4.2 parts.

Next, 0.05 part benzyldimethylketal was dissolved into the solution as a polymerization initiator and the result was spread on a substrate (copper plate) using a doctor knife applicator. The spread layer was polymerized by irradiating it with ultraviolet rays in room-temperature air at a luminous energy of 6 mW/cm$^2$ for 20 min, thereby producing a solid ion conductive polymer electrolyte.

Comparative Example 4

One part polyethylene oxide (product of Wako Pure Chemicals Co., Ltd., molecular weight: 2000) and 1 part lithium perchlorate anhydride were dissolved in a mixed solvent consisting of 10 parts tetrahydrofuran and 10 parts propylene carbonate, and the resulting solution was added with 1.5 parts poly(ethyleneglycol)dimethacrylate (oxyethylene unit number=9, product of Nippon Oil and Fats Co., Ltd.) and 1.5 parts methoxypoly(ethyleneglycol)monomethacrylate (oxyethylene unit number=9, product of Nippon Oil and Fats Co., Ltd.).

The viscosity of the mixed solution was adjusted by holding it at 40° C. under reduced pressure to remove solvent until the total remaining amount of the mixed solution was 15 parts.

Next, 0.05 part benzyldimethylketal was dissolved into the solution as a polymerization initiator and the result was spread on a substrate (Teflon plate) using a doctor knife applicator.

The spread layer was polymerized by irradiating it with ultraviolet rays in room-temperature air at a luminous energy of 6 mW/cm$^2$ for 20 min, thereby producing a solid ion conductive polymer electrolyte.

Comparative Example 5

A solid ion conductive polymer electrolyte was produced in the same manner as in Example 3 except that 2.5 parts poly(ethyleneglycol)dimethacrylate and 0.5 part methoxypoly(ethyleneglycol)monomethacrylate were used.

Comparative Example 6

A solid ion conductive polymer electrolyte was produced in the same manner as in Example 3 except that 45 parts hydroxypropyl cellulose and 10 parts lithium perchlorate were used and solvent was removed until the total remaining amount of the mixed solution was 68 parts.

Comparative Example 7

A solid ion conductive polymer electrolyte was produced in the same manner as in Example 3 except that 5 parts each of poly(ethyleneglycol)dimethacrylate and methoxypoly(ethyleneglycol)monomethacrylate and 3 parts lithium perchlorate were used and solvent was removed until the total remaining amount of the mixed solution was 24 parts.

The ion conductivities of the solid ion conductive polymer electrolytes synthesized in Examples 1–17 and the ion conductive compositions synthesized in Comparative Examples 1–7 were measured by the alternating current impedance method. The appearances of the electrolytes were evaluated. The results are shown in Table 1. The symbols representing appearance have the following meanings.

A: Film
B: Brittle film
C: Film not formed

The solid ion conductive polymer electrolyte according to the invention exhibited high ion conductivity and good holding performance.

TABLE 1 (1)

|  | Examples | | | | | | | | |
|---|---|---|---|---|---|---|---|---|---|
|  | 1 | 2 | 3 | 4 | 5 | 6 | 7 | 8 | 9 |
| Composition of solid ion conductive polymer electrolyte | | | | | | | | | |
| Hydroxypropyl cellulose | 1 | 1 | 1 | 1 | | | | | |
| Cyanoethylated hydroxypropyl cellulose | | | | | 1 | 1 | | | |
| Dihydroxypropyl cellulose | | | | | | | 1 | 1 | |
| Cyanoethylated dihydroxypropyl cellulose | | | | | | | | | 1 |
| Acetylated hydroxypropyl cellulose | | | | | | | | | |
| Hydroxyethyl starch | | | | | | | | | |
| Dihydroxypropyl dextran | | | | | | | | | |
| Cyanoethylated hydroxyethyl starch | | | | | | | | | |
| Polyethylene oxide | | | | | | | | | |
| Poly(ethyleneglycol)dimethacrylate | 0.5 | 2.5 | 1.5 | 1.5 | 1.5 | 1.5 | 1.5 | 1.5 | 1.5 |
| Methoxypoly(ethyleneglycol)monomethyacrylate | 1.5 | 2.5 | 1.5 | 1.5 | 1.5 | 1.5 | 1.5 | 1.5 | 1.5 |
| Lithium perchlorate | 1 | 2 | 1 | 1 | 1 | 1 | 1 | 1 | 1 |
| THF | 0.2 | | | | | | | | |
| Propylene carbonate | | 10 | 10 | 10 | 10 | 10 | 10 | 10 | 10 |
| Water | | | | | | | | | |
| Polymerization starting condition | UV[a] | UV | UV | Electron beam | UV | UV | UV | UV | UV |
| Ion conductivity (S/cm) 25° C. | $1.2 \times 10^{-5}$ | $1.0 \times 10^{-5}$ | $4.2 \times 10^{-3}$ | $3.8 \times 10^{-3}$ | $3.3 \times 10^{-3}$ | $1.1 \times 10^{-3}$ | $2.4 \times 10^{-3}$ | $4.2 \times 10^{-3}$ | $2.9 \times 10^{-3}$ |
| Appearance | A | A | A | A | A | A | A | A | A |

*UV: Ultraviolet rays

TABLE 1 (2)

|  | Examples | | | | | | | |
|---|---|---|---|---|---|---|---|---|
|  | 10 | 11 | 12 | 13 | 14 | 15 | 16 | 17 |
| Composition of solid ion conductive polymer electrolyte | | | | | | | | |
| Hydroxypropyl cellulose | | | | | 1 | 1 | 1 | 1 |
| Cyanoethylated hydroxypropyl cellulose | | | | | | | | |
| Dihydroxypropyl cellulose | | | | | | | | |
| Cyanoethylated dihydroxypropyl cellulose | | | | | | | | |
| Acetylated hydroxypropyl cellulose | 1 | | | | | | | |
| Hydroxyethyl starch | | 1 | | | | | | |
| Dihydroxypropyl dextran | | | 1 | | | | | |
| Cyanoethylated hydroxyethyl starch | | | | 1 | | | | |
| Polyethylene oxide | | | | | | | | |

TABLE 1 (2)-continued

| | Examples | | | | | | | |
|---|---|---|---|---|---|---|---|---|
| | 10 | 11 | 12 | 13 | 14 | 15 | 16 | 17 |
| Poly(ethyleneglycol)dimethacrylate | 1.5 | 0.5 | 0.5 | 1.5 | 0.5 | 1.5 | 0.5 | 0.1 |
| Methoxypoly(ethyleneglycol)monomethyacrylate | 1.5 | 1.5 | 1.5 | 1.5 | 1.5 | 1.5 | 2.5 | 0.1 |
| Lithium perchlorate | 1 | 1 | 1 | 1 | 1 | 1 | 1 | 1 |
| THF | >10 | | | >10 | 0.2 | 25 | >10 | >0.2 |
| Propylene carbonate | | | | | | | | |
| Water | | 10 | 10 | | | | | |
| Polymerization starting condition | UV | UV | UV | UV | Heating | UV | UV | UV |
| Ion conductivity (S/cm) 25° C. | $3.1 \times 10^{-3}$ | $3.4 \times 10^{-3}$ | $2.9 \times 10^{-3}$ | $1.5 \times 10^{-3}$ | $1.8 \times 10^{-5}$ | $5.9 \times 10^{-3}$ | $3.7 \times 10^{-3}$ | $8.5 \times 10^{-4}$ |
| Appearance | A | A | A | A | A | A | A | A |

TABLE 1 (3)

| | Comparative Embodiments | | | | | | |
|---|---|---|---|---|---|---|---|
| | 1 | 2 | 3 | 4 | 5 | 6 | 7 |
| Composition of solid ion conductive polymer electrolyte | | | | | | | |
| Hydroxypropyl cellulose | 1 | | | | 1 | 45 | 1 |
| Cyanoethylated hydroxypropyl cellulose | | | | | | | |
| Dihydroxypropyl cellulose | | | | | | | |
| Cyanoethylated dihydroxypropyl cellulose | | | | | | | |
| Acetylated hydroxypropyl cellulose | | | | | | | |
| Hydroxyethyl starch | | | | | | | |
| Dihydroxypropyl dextran | | | | | | | |
| Cyanoethylated hydroxyethyl starch | | | | | | | |
| Polyethylene oxide | | | 1 | 1 | | | |
| Poly(ethyleneglycol)dimethacrylate | | 0.5 | 0.5 | 1.5 | 2.5 | 1.5 | 5 |
| Methoxypoly(ethyleneglycol)monomethyacrylate | | 1.5 | 1.5 | 1.5 | 0.5 | 1.5 | 5 |
| Lithium perchlorate | 1 | 1 | 1 | 1 | 1 | 10 | 3 |
| THF | >10 | 10 | 0.2 | >10 | >10 | >10 | >10 |
| Propylene carbonate | | | | | | | |
| Water | | | | | | | |
| Polymerization starting condition | | UV | UV | UV | UV | UV | UV |
| Ion conductivity (S/cm) 25° C. | $1.9 \times 10^{-4}$ | $2.1 \times 10^{-5}$ | $1.1 \times 10^{-6}$ | $4.2 \times 10^{-4}$ | $2.8 \times 10^{-3}$ | $3.6 \times 10^{-5}$ | $3.2 \times 10^{-3}$ |
| Appearance | C | C | B | B | B | B | C |

What is claimed is:

1. A composition for a solid polymer electrolyte comprising 100 parts by weight of hydroxyalkyl polysaccharide and/or hydroxyalkyl polysaccharide derivative, 10–500 parts by weight of a diester compound containing a polyoxyalkylene component and a monoester compound containing a polyoxyalkylene component, and 5–1000 parts by weight of an ion conductive metallic salt.

2. A composition according to claim 1, wherein the weight ratio of diester compound/monoester compound is 1–0.2.

3. A composition for a solid polymer electrolyte according to claim 1, wherein the hydroxyalkyl polysaccharide derivative is a hydroxyalkyl polysaccharide derivative obtained by introducing some or all of the hydroxy groups in a hydroxyalkyl polysaccharide with substituents through ester bonding or ether bonding.

4. A composition for a solid polymer electrolyte according to claim 1, wherein the diester compound containing a polyoxyalkylene component is represented by the formula

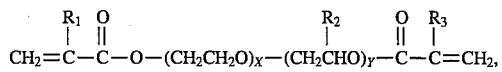

wherein $R_1$, $R_2$, $R_3$ each represents H or a $C_1$–$C_6$ alkyl group and X and Y satisfy the condition of $X \geq 1$ and $Y \geq 0$ or the condition of $X \geq 0$ and $Y \geq 1$, and the monoester compound containing a polyoxyalkylene component is represented by the formula

wherein $R_4$, $R_5$, $R_6$ each represents H or a $C_1$–$C_6$ alkyl group and A and B satisfy the condition of $A \geq 1$ and $B \geq 0$ or the condition of $A \geq 0$ and $B \geq 1$.

5. A composition for a solid polymer electrolyte according to claim 1, further comprising a solvent which can dissolve the ion conductive metallic salt.

6. A method of producing a solid polymer electrolyte comprising a step of heating or exposing to ultraviolet rays, an electron beam, X rays, gamma rays, microwaves or high-frequency waves a composition for a solid polymer electrolyte according to claim 1.

7. A solid polymer electrolyte obtained by the method according to claim 6.

* * * * *